United States Patent
Taniike

(10) Patent No.: US 11,353,753 B2
(45) Date of Patent: Jun. 7, 2022

(54) METHOD FOR PRODUCING SUBSTRATE WITH PHOTO-ALIGNMENT FILM

(71) Applicant: SHARP KABUSHIKI KAISHA, Osaka (JP)

(72) Inventor: Kohshiroh Taniike, Sakai (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 501 days.

(21) Appl. No.: 16/531,839

(22) Filed: Aug. 5, 2019

(65) Prior Publication Data

US 2020/0050061 A1 Feb. 13, 2020

Related U.S. Application Data

(60) Provisional application No. 62/716,258, filed on Aug. 8, 2018.

(51) Int. Cl.
| | |
|---|---|
| G02F 1/1337 | (2006.01) |
| G02F 1/1335 | (2006.01) |
| B29D 11/00 | (2006.01) |
| G02F 1/13 | (2006.01) |
| B05D 3/06 | (2006.01) |

(52) U.S. Cl.
CPC ......... *G02F 1/133788* (2013.01); *B05D 3/06* (2013.01); *B29D 11/00788* (2013.01); *G02F 1/1303* (2013.01); *G02F 1/133528* (2013.01); *C09K 2323/02* (2020.08)

(58) Field of Classification Search
CPC ............... G02F 1/133788; G02F 1/103; G02F 1/133528; B05D 3/06; B29D 11/00788; C09K 2323/02
USPC .......... 428/1.2, 195.1; 427/493, 508
See application file for complete search history.

(56) References Cited

U.S. PATENT DOCUMENTS

2015/0119522 A1* 4/2015 Ooki ................. C08G 73/1075
427/553

FOREIGN PATENT DOCUMENTS

| JP | 2010-112986 A | 5/2010 |
| JP | 2016-212376 A | 12/2016 |

* cited by examiner

*Primary Examiner* — Ruiyun Zhang
(74) *Attorney, Agent, or Firm* — ScienBiziP, P.C.

(57) ABSTRACT

The present invention provides a method for producing a substrate with a photo-alignment film, which increases the refractive index anisotropy while reducing a decrease in production efficiency. The method for producing a substrate with a photo-alignment film includes the steps of: (A) forming on a surface of a substrate a film of a photo-alignment film material containing a polymer with a photo-functional group; (B) irradiating the film formed in the step (A) with polarized light obtained by polarizing light emitted from a light emitting diode lamp; and (C) irradiating the film having been subjected to the polarized light irradiation in the step (B) with polarized light obtained by polarizing light emitted from a metal halide lamp.

5 Claims, 2 Drawing Sheets

METHOD FOR PRODUCING SUBSTRATE WITH PHOTO-ALIGNMENT FILM

CROSS-REFERENCE TO RELATED APPLICATIONS

The present application claims priority under 35 U.S.C. § 119 to U.S. Provisional Patent Application No. 62/716,258 filed on Aug. 8, 2018, the contents of which are incorporated herein by reference in their entirety.

BACKGROUND OF THE INVENTION

Field of the Invention

The present invention relates to methods for producing a substrate with a photo-alignment film.

Description of Related Art

Liquid crystal display devices typically include an alignment film that controls the alignment of liquid crystal molecules. The alignment controlling force to control the alignment of liquid crystal molecules is provided to the alignment film by subjecting the film to an alignment treatment such as a rubbing treatment or a photo-alignment treatment in formation thereof such that the alignment film shows refractive index anisotropy. The rubbing treatment, however, involves an issue such as a decrease in the display quality due to dust emission from the rubbing cloth. Thus, a method for forming a photo-alignment film by the photo-alignment treatment instead of the rubbing treatment has been studied (for example, JP 2016-212376 A). Another method studied to control the alignment of liquid crystal molecules is, for example, a method for applying a magnetic field to liquid crystal molecules (liquid crystal compounds) (for example, JP 2010-112986 A).

BRIEF SUMMARY OF THE INVENTION

In the photo-alignment treatment, for example, the alignment film may be irradiated with polarized light obtained by polarizing light emitted from a high-pressure discharge lamp such as a metal halide lamp or a high-pressure mercury vapour lamp. The photo-alignment treatment, however, can still have room for improvement in that the refractive index anisotropy of the photo-alignment film can be increased.

Meanwhile, the invention disclosed in JP 2016-212376 A, for example, suggests a photo-alignment treatment utilizing a light emitting diode lamp. Simple utilization of a light emitting diode lamp, however, unfortunately requires long irradiation duration to achieve the desired irradiation dose, which decreases the production efficiency. Also, the invention disclosed in JP 2010-112986 A aims to cure liquid crystal compounds through magnetic field application and unpolarized light irradiation, and does not aim to control the alignment of liquid crystal molecules using a photo-alignment film.

In response to the above issues, an object of the present invention is to provide a method for producing a substrate with a photo-alignment film, which increases the retractive index anisotropy while reducing a decrease in production efficiency.

(1) One embodiment of the present invention is directed to a method for producing a substrate with a photo-alignment film, including the steps of: (A) forming on a surface of a substrate a film of a photo-alignment film material containing a polymer with a photo-functional group; (B) irradiating the film formed in the step (A) with polarized light obtained by polarizing light emitted from a light emitting diode lamp; and (C) irradiating the film having been subjected to the polarized light irradiation in the step (B) with polarized light obtained by polarizing light emitted from a metal halide lamp.

(2) In an embodiment of the present invention, the method includes the process (1), and a polarized light irradiation dose in the step (B) is lower than a polarized light irradiation dose in the step (C).

(3) In an embodiment of the present invention, the method includes the process (1) or (2), and in the step (B), the light emitted from the light emitting diode lamp is polarized through a wire grid polarizer.

(4) In an embodiment of the present invention, the method includes any one of the processes (1) to (3), and in the step (C), the light emitted from the metal halide lamp is polarized through a wavelength selective filter and a wire grid polarizer in order.

(5) In an embodiment of the present invention, the method includes any one of the processes (1) to (4) and further includes a step of drying the film formed in the step (A) before the step (B).

(6) In an embodiment of the present invention, the method includes any one of the processes (1) to (5) and further includes a step of baking the film having been subjected to the polarized light irradiation in the step (C).

The present invention can provide a method for producing a substrate with a photo-alignment film, which increases the refractive index anisotropy while reducing a decrease in production efficiency.

DETAILED DESCRIPTION OF THE INVENTION

Figure 1:
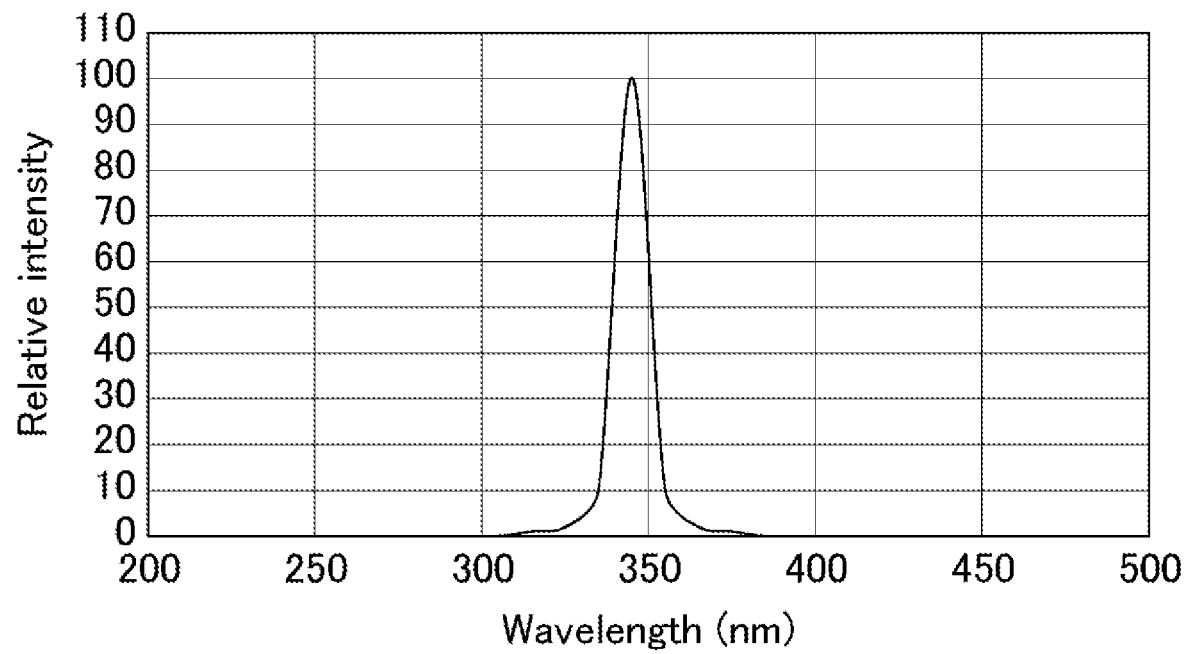
FIG. 1 is a graph showing exemplary spectral characteristics of a light emitting diode lamp.

The present invention is described in more detail based on the following embodiment with reference to the drawings. The embodiment, however, is not intended to limit the scope of the present invention. The configurations of the embodiment may appropriately be combined or modified within the spirit of the present invention.

Herein, the expression "X to Y" means "X or more and Y or less".

Embodiment

The method for producing a substrate with a photo-alignment film according to an embodiment is described below.

<Formation of Film of Photo-Alignment Film Material>

A photo-alignment film material is applied to a surface of a substrate, so that a film of the photo-alignment film material is formed.

The photo-alignment film material may be applied by, for example, a method such as flexo printing or ink jetting.

The photo-alignment film material contains a polymer with a photo-functional group. Examples of the photo-functional group include a moiety that undergoes a photoreaction such as photodimerization, photoisomerization, photo-Fries rearrangement, or photodecomposition when irradiated with light. A photo-functional group that can undergo photodimerization and photoisomerization may be, for example, a cinnamate, chalcone, coumarin, or stilbene group. A photo-functional group that can undergo photoisomerization may be, for example, an azobenzene or tolane group. A photo-functional group that can undergo photo-Fries rearrangement may be, for example, a phenolic ester group. A photo-functional group that can undergo photodecomposition may be, for example, a cyclobutane ring.

The polymer in the photo-alignment film material may contain a photo-functional group in its main chain or side chain.

The polymer in the photo-alignment film material may contain a structure such as a polyamic acid structure, a polyimide structure, a polysiloxane structure, or a polyvinyl structure in its main chain.

The photo-alignment film material may further contain a solvent. Examples of the solvent include organic solvents such as N-methyl-2-pyrrolidone, butyl cellosolve, and γ-butyrolactone.

Examples of the substrate include transparent substrates such as a glass substrate and a plastic substrate. On the surface close to the film of the photo-alignment film material of the substrate may appropriately be arranged members such as gate lines, source lines, thin-film transistor elements, pixel electrodes, and a common electrode, or members such as color filters, a black matrix, and an overcoat layer. In other words, the substrate may be a thin-film transistor array substrate or a color filter substrate.

<Drying>

Then, the film of the photo-alignment film material may be dried. This volatilizes a solvent in the photo-alignment film material, if the solvent is contained. Drying the film of the photo-alignment film material may partially or fully remove the solvent. In order to maintain the fluidity of the polymer in the photo-alignment film material and prevent lowering of the photoreactivity of the photo-alignment film material (photo-functional group) in the subsequent photo-alignment treatment, the drying of the film of the photo-alignment film material preferably partially removes the solvent (partially leaves the solvent). The film of the photo-alignment film material may be dried at 50° C. to 70° C. for 80 to 120 seconds, for example, although the optimal conditions depend on the polymer contained in the photo-alignment film material.

<First Photo-Alignment Treatment>

The film of the photo-alignment film material is then subjected to a first photo-alignment treatment in which the film is irradiated with polarized light obtained by polarizing light emitted from a light emitting diode (LED) lamp.

FIG. 1 is a graph showing exemplary spectral characteristics of a light emitting diode lamp. The vertical axis in FIG. 1 shows the relative intensity with the maximum intensity taken as 100. As shown in FIG. 1, the light emitting diode lamp has a narrow emission wavelength region (full width at half maximum). Thus, use of the light emitting diode lamp, which has an emission peak around the dominant wavelength (wavelength at which the absorbance is highest) of light causing the photoreaction of the photo-alignment film material (photo-functional group), eliminates the need for adjusting the wavelength region of the irradiation light using a wavelength selective filter.

In the first photo-alignment treatment, the light emitted from the light emitting diode lamp may be polarized through a wire grid polarizer.

A wire grid polarizer having a higher extinction ratio shows a higher degree of polarization. The degree of polarization changes across the entire wavelength region; it is highest at the dominant wavelength and becomes lower at a wavelength farther from the dominant wavelength. Hence, setting the dominant wavelength of the wire grid polarizer to a wavelength around the emission peak wavelength of the light emitting diode lamp enables polarized light irradiation with a high degree of polarization. In this case, adjusting the dominant wavelength of light causing the photoreaction of the photo-alignment film material (photo-functional group) according to these wavelengths can efficiently increase the refractive index anisotropy of the resulting photo-alignment film.

Examples of the wire grid polarizer include one whose thin metallic wires are arranged on an optically transparent substrate at a pitch shorter than the wavelength of the incident light. The thin metallic wires are formed from, for example, a light-absorbing metal material such as chromium, aluminum, or titanium oxide.

The polarized light applied in the first photo-alignment treatment is preferably linearly polarized light, more preferably linearly polarized ultraviolet light. The linearly polarized ultraviolet light may have a wavelength of 330 to 350 nm, for example.

<Second Photo-Alignment Treatment>

The film of the photo-alignment film material is then subjected to a second photo-alignment treatment in which the film is irradiated with polarized light obtained by polarizing light emitted from a metal halide lamp.

In the second photo-alignment treatment, the light emitted from the metal halide lamp may be polarized through a wavelength selective filter and a wire grid polarizer in order.

Figure 2:
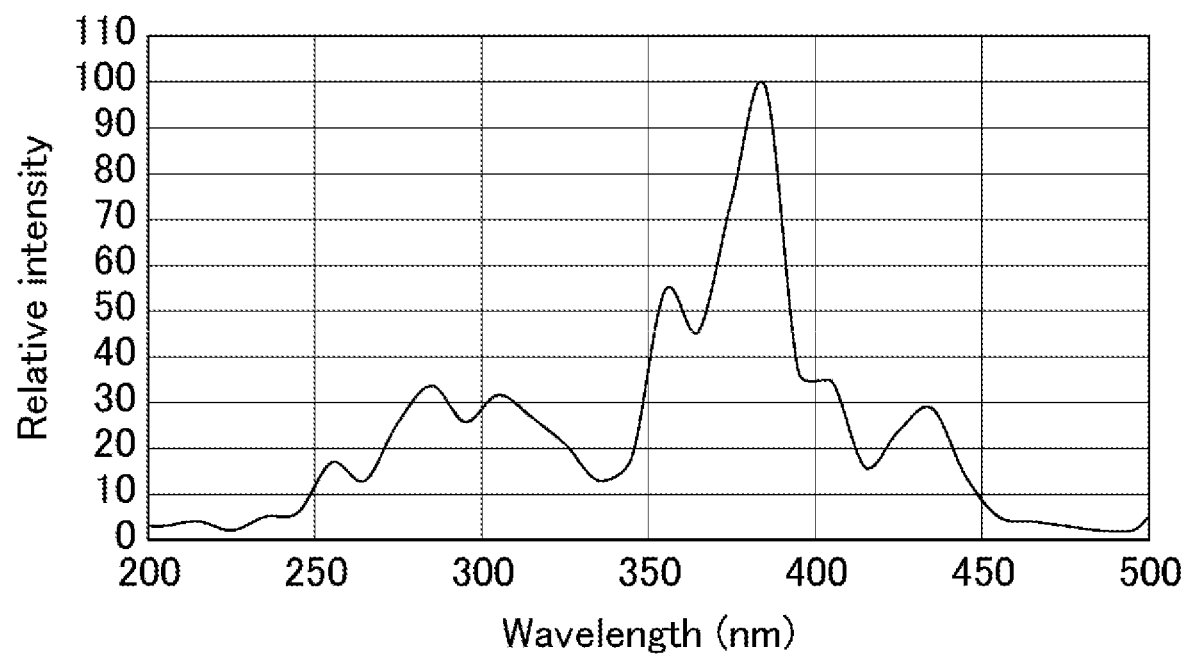
FIG. 2 is a graph showing exemplary spectral characteristics of a metal halide lamp.
Figure 3:
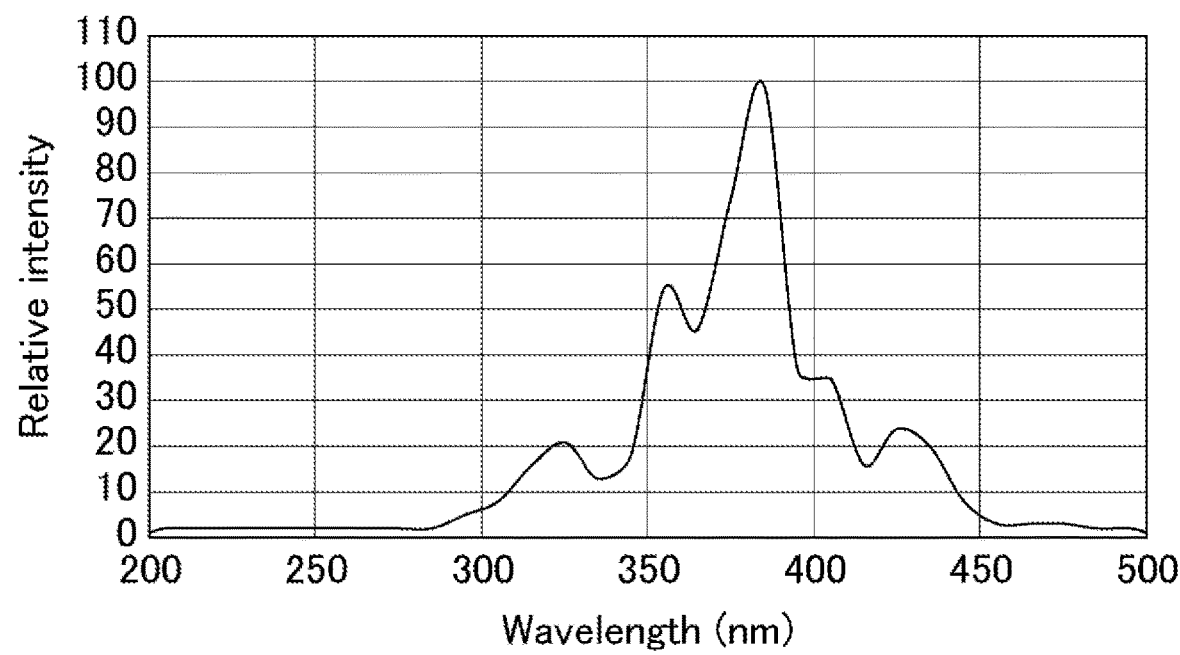
FIG. 3 is a graph showing exemplary spectral characteristics of the metal halide lamp having the spectral characteristics in FIG. 2 in the case where the lamp is used in combination with a wavelength selective filter.

FIG. 2 is a graph showing exemplary spectral characteristics of a metal halide lamp. The vertical axis in FIG. 2 shows the relative intensity with the maximum intensity taken as 100. As shown in FIG. 2, the emission wavelength region of the metal halide lamp is wider than the emission wavelength region of the light emitting diode lamp shown in FIG. 1. Thus, polarized light irradiation can be efficiently performed by narrowing down the wavelength region of the light emitted from the metal halide lamp through a wavelength selective filter as shown in FIG. 3 and then polarizing the light through a wire grid polarizer. FIG. 3 is a graph showing exemplary spectral characteristics of the metal halide lamp having the spectral characteristics in FIG. 2 in the case where the lamp is used in combination with a wavelength selective filter. The vertical axis in FIG. 3 shows the relative intensity with the maximum intensity taken as 100.

Examples of the wavelength selective filter include a filter having dispersed therein a substance that absorbs light having a wavelength other than the transmission wavelength, and a filter whose surface is coated with a substance that reflects light having a wavelength other than the transmission wavelength.

The polarized light applied in the second photo-alignment treatment is preferably linearly polarized light, more preferably linearly polarized ultraviolet light. The linearly polarized ultraviolet light may have a wavelength of 330 to 420 nm, for example.

The first photo-alignment treatment and the second photo-alignment treatment cause the photoreaction of the photo-alignment film material (photo-functional group). Thereby, the later-produced photo-alignment film has refractive index anisotropy.

<Baking>

The film of the photo-alignment film material may then be baked. The baking polymerizes the polymer in the photo-alignment film material (cures the film of the photo-alignment film material). The resulting polymer has a main chain structure such as a polyamic acid structure, a polyimide structure, a polysiloxane structure, or a polyvinyl structure. The film of the photo-alignment film material may be baked at 170° C. to 230° C. for 30 to 40 minutes, for example.

In the case where the film of the photo-alignment film material is both dried and baked, the drying, which is performed first, is also referred to as pre-baking, and the baking, which is performed later, is also referred to as post-baking.

Thereby, the photo-alignment film is formed, so that the substrate with a photo-alignment film is produced. The substrate with a photo-alignment film produced in the present embodiment may be used as, for example, at least one of a pair of substrates between which a liquid crystal layer is held in a liquid crystal panel. Examples of the liquid crystal panel include horizontal electric field mode liquid crystal panels such as an in-plane switching (TPS) mode one and a fringe field switching (FFS) mode one. In the case where the substrate with a photo-alignment film produced in the present embodiment is applied to a liquid crystal panel, the photo-alignment film has refractive index anisotropy and thus exerts the alignment controlling force controlling the alignment (initial alignment) of liquid crystal molecules in the liquid crystal layer. This means that increasing the refractive index an of the photo-alignment film can increase the alignment controlling force. Thus, a liquid crystal panel having excellent image sticking resistance can be obtained.

The photo-alignment treatment of the present embodiment includes two kinds of photo-alignment treatments, namely the first photo-alignment treatment irradiating the film with polarized light obtained by, polarizing light emitted from the light emitting diode lamp and the second photo-alignment treatment, after the first photo-alignment treatment, irradiating the film with polarized light obtained by polarizing light emitted from the metal halide lamp.

The first photo-alignment treatment can perform polarized light irradiation with a high degree of polarization owing to the spectral characteristics (e.g., those as shown in FIG. 1) of the light emitting diode lamp. Although this treatment produces a photo-alignment film having high refractive index anisotropy, the first photo-alignment treatment alone performed as the photo-alignment treatment unfortunately decreases the production efficiency. This is because toe light emitting diode lamp requires long irradiation duration to achieve the desired irradiation dose due to its low power output.

The present embodiment therefore employs the second photo-alignment treatment using a high power output metal halide lamp as well as the first photo-alignment treatment, thereby shortening the irradiation duration to achieve the desired irradiation dose and reducing the decrease in production efficiency, as compared with the case employing the first photo-alignment treatment alone. Here, the second photo-alignment treatment alone performed as the photo-alignment treatment results in polarized light irradiation with a comparatively low degree of polarization due to the wide emission wavelength region. This still increases toe production efficiency, but fails to sufficiently increase the refractive index anisotropy of the resulting photo-alignment film.

As described above, in order to increase the refractive index anisotropy while reducing the decrease in production efficiency, it is important to perform the first photo-alignment treatment and the second photo-alignment treatment in combination as in the present embodiment.

From the viewpoint of production efficiency, the polarized light irradiation dose in the first photo-alignment treatment is preferably lower than the polarized light irradiation dose in the second photo-alignment treatment. Even when the production efficiency is increased by decreasing the polarized light irradiation dose in the first photo-alignment treatment, a photo-alignment film having high refractive index anisotropy can be obtained since the first photo-alignment treatment achieves polarized light irradiation with a high degree of polarization.

Examples and Comparative Examples

The present invention is described in more detail based on the following examples and comparative examples. The examples, however, are not intended to limit the scope of the present invention.

Example 1

A substrate with a photo-alignment film of Example 1 was produced by the following method.
(Formation of Film of Photo-Alignment Film Material)
A photo-alignment film material containing a photoisomerizable polymer containing an azobenzene group was applied to a surface of a glass substrate by flexo printing, so that a film of the photo-alignment film material was formed.
(Drying)
The film of the photo-alignment film material was dried at 60° C. for 90 seconds.
(First Photo-Alignment Treatment)
The film of the photo-alignment film material was then subjected to a first photo-alignment treatment in which the film was irradiated with polarized light obtained by polarizing light emitted from a light emitting diode lamp through a wire grid polarizer.

The light emitting diode lamp used was one having the spectral characteristics shown in FIG. 1. The emission peak wavelength in FIG. 1 was around the dominant wavelength causing the photoreaction of the photo-alignment film material (azobenzene group).

The wire grid polarizer used was one having the maximum extinction ratio around the emission peak wavelength of the light emitting diode lamp.
(Second Photo-Alignment Treatment)
The film of the photo-alignment film material was then subjected to a second photo-alignment treatment in which the film was irradiated with polarized light obtained by polarizing light emitted from a metal halide lamp through a wavelength selective filter and a wire grid polarizer in order.

The metal halide lamp used was one having the spectral characteristics shown in FIG. 2. The light emitted from the metal halide lamp and transmitted through the wavelength selective filter had the spectral characteristics shown in FIG. 3. The wire grid polarizer used was similar to that used in the first photo-alignment treatment.

The percentage of the polarized light irradiation dose in the first photo-alignment treatment was 50% of the total polarized light irradiation dose in the first photo-alignment treatment and the second photo-alignment treatment. In other words, the percentage of the polarized light irradiation dose in the photo-alignment treatment using the light emitting diode lamp (hereinafter, also referred to as "LED percentage") was 50% of the total polarized light irradiation dose in the photo-alignment treatments (in Example 1, the first photo-alignment treatment and the second photo-alignment treatment). The total polarized light irradiation dose in the photo-alignment treatments was the same in all the following examples and comparative examples.

(Baking)

The film of the photo-alignment film material was then baked at 175° C. to 220° C. for 30 minutes.

Thereby, the photo-alignment film was formed, so that the substrate with a photo-alignment film of Example 1 was completed.

Example 2

A substrate with a photo-alignment film of Example 2 was produced as in Example 1, except that the LED percentage was 25%.

Example 3

A substrate with a photo-alignment film of Example 3 was produced as in Example 1, except that the LED percentage was 20%.

Comparative Example 1

A substrate with a photo-alignment film of Comparative Example 1 was produced as in Example 1, except that only the second photo-alignment treatment alone, i.e., only the photo-alignment treatment using the metal halide lamp, was performed as the photo-alignment treatment. Thus, the LED percentage was 0%.

Comparative Example 2

A substrate with a photo-alignment film of Comparative Example 2 was produced as in Comparative Example 1, except that the photo-alignment treatment was performed using the metal halide lamp whose spectral characteristics changed. Thus, the LED percentage was 0%.

Figure 4:
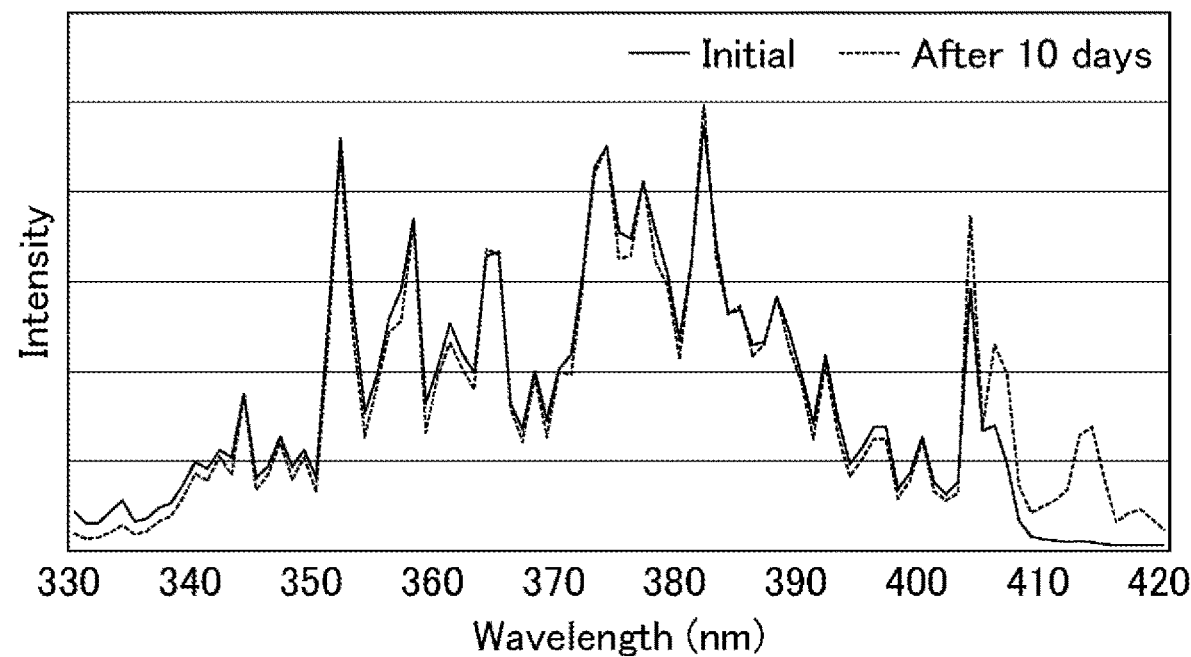
FIG. 4 is a graph comparing the spectral characteristics of the metal halide lamp in the initial lighting state and the spectral characteristics thereof in the lighting state after 10 days.

FIG. 4 is a graph comparing the spectral characteristics of the metal halide lamp in the initial lighting state and the spectral characteristics thereof in the lighting state after 10 days. As shown in FIG. 4, in the lighting state after 10 days (the state after continuous lighting was performed for 10 days), the spectral characteristics of the metal halide lamp are different from the spectral characteristics in the initial lighting state. Specifically, in the lighting state after 10 days, the intensity in the wavelength region of 330 to 350 nm decreased while the intensity in the wavelength region of 400 to 420 nm increased, as compared with the intensities in the initial lighting state. Since the emission wavelength region of a metal halide lamp is wide, even when a constant irradiation dose is maintained, the change in spectral characteristics as shown in FIG. 4, for example, may greatly affect the photoreactivity of the photo-alignment film material (photo-functional group). In contrast, since the emission wavelength region of a light emitting diode lamp is narrow, the spectral characteristics do not change even after the lamp is kept on for a long period of time as long as a constant irradiation dose is maintained. The lighting state of the metal halide lamp used in Comparative Example 2 was the lighting state after the lamp was kept on for 10 days, and the lighting state of the metal halide lamp used in Examples 1 to 3 and Comparative Examples 1 and 4 was the initial lighting state.

Comparative Example 3

A substrate with a photo-alignment film of Comparative Example 3 was produced as in Example 1, except that the first photo-alignment treatment alone, i.e., only the photo-alignment treatment using the light emitting diode lamp, was performed as the photo-alignment treatment. Thus, the LED percentage was 100%.

Comparative Example 4

A substrate with a photo-alignment film of Comparative Example 4 was produced as in Example 1, except that the order of the first photo-alignment treatment and the second photo-alignment treatment was inverted. Thus, the LED percentage was 50%.

[Evaluation]

The refractive index anisotropy of the photo-alignment film of each of the substrates with photo-alignment film of Examples 1 to 3 and Comparative Examples 1 to 4 was measured. Table 1 shows the results.

The refractive index anisotropy of the photo-alignment film was measured as follows. First, the substrate with a photo-alignment film was irradiated with light from the direction normal thereto on the photo-alignment film side, so that the retardation ($\Delta$nd) of the transmitted light was measured. The measured retardation ($\Delta$nd) of the transmitted light was divided by the thickness (d) of the photo-alignment film to calculate the refractive index anisotropy ($\Delta$n). The retardation of the transmitted light was measured using "AxoScan FAA-3 series" from Axometrics, Inc. The thickness of the photo-alignment film was measured using a fully automatic microfigure measuring instrument (contact profilometer) "ET5000" from Kosaka Laboratory Ltd. The refractive index anisotropy in Table 1 shows the average value and the standard deviation when the refractive index anisotropy was measured at eight sites.

TABLE 1

| | Photo-alignment treatment | | LED percentage (%) | Refractive index anisotropy | |
|---|---|---|---|---|---|
| | Specific treatment (order) | | | Average value | Standard deviation |
| Example 1 | First photo-alignment treatment (first time) | Second photo-alignment treatment (second time) | 50 | 0.02443 | 0.00112 |

TABLE 1-continued

| | Photo-alignment treatment | | LED percentage (%) | Refractive index anisotropy | |
|---|---|---|---|---|---|
| | Specific treatment (order) | | | Average value | Standard deviation |
| Example 2 | First photo-alignment treatment (first time) | Second photo-alignment treatment (second time) | 25 | 0.02418 | 0.00141 |
| Example 3 | First photo-alignment treatment (first time) | Second photo-alignment treatment (second time) | 20 | 0.02397 | 0.00163 |
| Comparative Example 1 | Second photo-alignment treatment | | 0 | 0.02105 | 0.00191 |
| Comparative Example 2 | Second photo-alignment treatment | | 0 | 0.01889 | 0.00276 |
| Comparative Example 3 | First photo-alignment treatment | | 100 | 0.02431 | 0.00089 |
| Comparative Example 4 | Second photo-alignment treatment (first time) | First photo-alignment treatment (second time) | 50 | 0.02143 | 0.00209 |

As shown in Table 1, the photo-alignment films obtained in Examples 1 to 3 had a high average value of the refractive index anisotropies. In Example 2, the LED percentage was lower and the production efficiency was higher than in Example 1, but the average value of the refractive index anisotropies was not significantly different from that in Example 1. In Example 3, the LED percentage was lower and the production efficiency was higher than in Example 2, but the average value of the refractive index anisotropies was not significantly different from that in Example 2.

In Comparative Example 1, since the second photo-alignment treatment alone was performed as the photo-alignment treatment, the average value of the refractive index anisotropies was lower and the standard deviation was greater than in Examples 1 to 3.

In Comparative Example 2, since the second photo-alignment treatment alone was performed as the photo-alignment treatment, the average value of the refractive index anisotropies was lower and the standard deviation was greater than in Examples 1 to 3. Also, use of the metal halide lamp with different spectral characteristics in Comparative Example 2 led to a decrease in the average value of the refractive index anisotropies by 10% or more and the standard deviation was great as compared with Comparative Example 1.

In Comparative Example 3, since the first photo-alignment treatment alone was performed as the photo-alignment treatment, the average value of the refractive index anisotropies was not significantly different but the production efficiency was lower than in Examples 1 to 3.

In Comparative Example 4, the first photo-alignment treatment and the second photo-alignment treatment were performed in combination. Yet, since the order of the treatments was inverted, the average value of the refractive index anisotropies was lower and the standard deviation was greater than in Examples 1 to 3. Thus, comparison of Comparative Example 4 with Examples 1 to 3 shows that the dominant factor affecting the refractive index anisotropy of the photo-alignment film is the polarized light applied in the earlier photo-alignment treatment. In other words, the results show that when polarized light irradiation with a high degree of polarization is performed first as the photo-alignment treatment as in Examples 1 to 3, a photo-alignment film with significantly high refractive index anisotropy can be obtained. In Examples 1 to 3, presumably, the polarized light irradiation with a high degree of polarization, which was performed first, aligned some of the polymer molecules constituting the photo-alignment film, and the alignment caused the other polymer molecules to be aligned in the same manner.

What is claimed is:

1. A method for producing a substrate with a photo-alignment film, comprising the steps of:
   (A) forming on a surface of a substrate a film of a photo-alignment film material containing a polymer with a photo-functional group;
   (B) irradiating the film formed in the step (A) with polarized light obtained by polarizing light emitted from a light emitting diode lamp; and
   (C) irradiating the film having been subjected to the polarized light irradiation in the step (B) with polarized light obtained by polarizing light emitted from a metal halide lamp,
   wherein a polarized light irradiation dose in the step (B) is lower than a polarized light irradiation dose in the step (C).

2. The method for producing a substrate with a photo-alignment film according to claim 1,
   wherein in the step (B), the light emitted from the light emitting diode lamp is polarized through a wire grid polarizer.

3. The method for producing a substrate with a photo-alignment film according to claim 1,
   wherein in the step (C), the light emitted from the metal halide lamp is polarized through a wavelength selective filter and a wire grid polarizer in order.

4. The method for producing a substrate with a photo-alignment film according to claim 1, further comprising a step of drying the film formed in the step (A) before the step (B).

5. The method for producing a substrate with a photo-alignment film according to claim 1, further comprising a step of baking the film having been subjected to the polarized light irradiation in the step (C).

* * * * *